(12) United States Patent
Matsuoka (10) Patent No.: US 11,331,641 B2
(45) Date of Patent: May 17, 2022

(54) REACTOR AND REACTOR SYSTEM PROVIDED WITH SAME

(71) Applicant: KOBE STEEL, LTD., Hyogo (JP)

(72) Inventor: Akira Matsuoka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 17/254,831

(22) PCT Filed: Jul. 2, 2019

(86) PCT No.: PCT/JP2019/026221
§ 371 (c)(1),
(2) Date: Dec. 21, 2020

(87) PCT Pub. No.: WO2020/013022
PCT Pub. Date: Jan. 16, 2020

(65) Prior Publication Data
US 2021/0260557 A1 Aug. 26, 2021

(30) Foreign Application Priority Data

Jul. 12, 2018 (JP) .............................. JP2018-132201

(51) Int. Cl.
*B01J 14/00* (2006.01)
*B01J 19/00* (2006.01)
(52) U.S. Cl.
CPC ........... *B01J 14/00* (2013.01); *B01J 19/0006* (2013.01); *B01J 2219/00063* (2013.01); *B01J 2219/00164* (2013.01)
(58) Field of Classification Search
CPC .................... B01J 14/00; B01J 19/0006; B01J 2219/00063; B01J 2219/00164
See application file for complete search history.

(56) References Cited

U.S. PATENT DOCUMENTS 4,918,168 A * 4/1990 Stepaniuk .............. B01J 19/242
534/565
2010/0298567 A1 11/2010 Roberge et al.
(Continued)

FOREIGN PATENT DOCUMENTS

JP 2007-204298 A 8/2007

OTHER PUBLICATIONS

Notification Concerning Transmittal of International Preliminary Report on Patentability and Translation of Written Opinion of the International Searching Authority; PCT/JP2019/026221; dated Jan. 21, 2021.

*Primary Examiner* — Lessanework Seifu
(74) *Attorney, Agent, or Firm* — Studebaker & Brackett PC (57) ABSTRACT

Provided is a reactor capable of generating a proposed target solution in a short time by reacting the raw material solutions with each other while allowing a mixed raw material solution containing a plurality of kinds of raw material solutions mixed with each other to flow, and restraining the temperature of the mixed raw material solution from excessively rising. The reactor includes a reaction channel allowing the mixed raw material solution to flow and a solvent channel allowing a solvent dissolvable in the mixed raw material solution to flow. The solvent channel is connected to the reaction channel between the upstream end and the downstream end of the reaction channel so that the solvent flowing in the solvent channel is mixed with the mixed raw material solution flowing in the reaction channel from the middle of the reaction channel.

1 Claim, 6 Drawing Sheets

(56) References Cited

U.S. PATENT DOCUMENTS

| | | | |
|---|---|---|---|
| 2013/0108513 A1* | 5/2013 | Samper | B01L 3/527 422/129 |
| 2016/0178077 A1* | 6/2016 | Matsuoka | F16K 99/0059 137/2 |
| 2018/0078938 A1* | 3/2018 | Tan | G01N 33/54366 |
| 2018/0304227 A1* | 10/2018 | Blum | B01J 19/241 |

* cited by examiner

REACTOR AND REACTOR SYSTEM PROVIDED WITH SAME

TECHNICAL FIELD

The present invention relates to a reactor for mixing a plurality of kinds of raw material solutions and reacting the raw material solutions with each other to thereby generate a purposed target solution, and a reactor system including the same.

BACKGROUND ART

Conventionally, there has been known a reactor for reacting a plurality of kinds of raw material solutions with each other while allowing a mixed raw material solution to flow, the mixed raw material solution containing the plurality of kinds of raw material solutions mixed with each other, to thereby generate a proposed target solution. The reaction in the mixed raw material solution involves generation of reaction heat, which raises the temperature of the mixed raw material solution. On the other hand, the reaction in the mixed raw material solution is more accelerated with the higher temperature of the mixed raw material solution. However, excessive rise of the temperature of the mixed raw material solution causes the reaction in the mixed raw material solution to run away. This generates a necessity of appropriately managing the temperature of the mixed raw material solution.

Patent Document 1 below discloses a method of nitrating an aromatic or heterocyclic aromatic compound by mixing an activated aromatic or heterocyclic aromatic compound with a nitrating agent in a microreactor. Specifically, it is disclosed to mix the activated aromatic or heterocyclic aromatic compound and the nitrating agent with a solvent to reduce the concentration of the activated aromatic or heterocyclic aromatic compound and the nitrating agent to thereby restrain the temperature in the microreactor from being excessively raised by reaction heat that occurs accompanying the mixing of the activated aromatic or heterocyclic aromatic compound with the nitrating agent.

The method described in Patent Document 1, however, requires a long time to generate a target solution because of mixing the solvent with the mixed raw material solution obtained by mixing a plurality of kinds of raw material solutions (namely, a mixed raw material solution consisting of an activated aromatic or heterocyclic aromatic compound and a nitration agent in Patent Document 1) in order to lower the concentration of the mixed raw material solution.

Although Patent Document 1 also discloses mixing an activated aromatic or heterocyclic aromatic compound with a nitrating agent under the condition of absence of solvent, such mixing causes the concentration of the substance contributing to the reaction in the mixed raw material solution to be high, which is likely to accelerate the reaction, making it difficult to control the temperature of the mixed raw material solution.

CITATION LIST

Patent Literature

Patent Literature 1: Japanese Unexamined Patent Publication No, 2009-523136

SUMMARY OF INVENTION

It is an object of the present invention to provide a reactor for reacting a plurality of kinds of raw material solutions with each other while allowing a mixed raw material solution to flow, the mixed raw material solution containing the plurality of kinds of raw material solutions mixed with each other, to thereby generate a proposed target solution, the reactor being capable of restraining the temperature in the mixed raw material solution from excessively rising, with a shortened time required for generating the target solution, and a reactor system including the same.

Provided is a reactor for mixing a plurality of kinds of raw material solutions to react them with each other to thereby generate a proposed target solution, the reactor comprising: a reaction channel that allows a mixed raw material solution to flow in the reaction channel, the mixed raw material solution containing the plurality of kinds of raw material solutions mixed with each other; and a solvent channel that allows a solvent to flow in the solvent channel, the solvent being dissolvable in the mixed raw material solution to thereby reduce a concentration of the raw material solution, the solvent channel being connected to the reaction channel between an upstream end and a downstream end of the reaction channel so as to cause the solvent flowing in the solvent channel to be mixed with the mixed raw material solution flowing in the reaction channel from the middle of the reaction channel.

DESCRIPTION OF EMBODIMENTS

Hereinafter, embodiments of the present invention will be specifically described with reference to the attached drawings.

Figure 1:
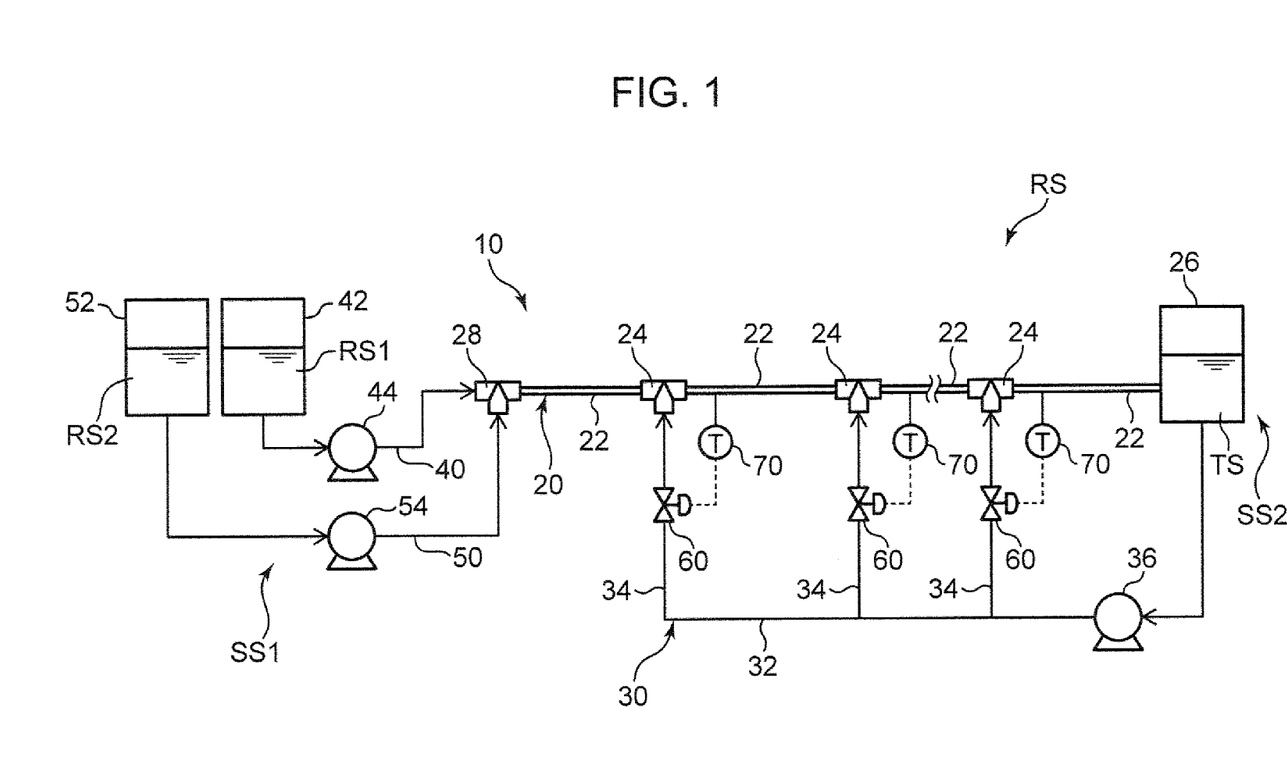
FIG. 1 is a diagram showing a configuration of a reactor according to a first embodiment of the present invention and a reactor system including the reactor.

Referring to FIG. 1, described are a reactor 10 according to a first embodiment of the present invention and a reactor system RS including the reactor 10. The reactor system. RS includes the reactor 10 shown in FIG. 1, a raw material solution supply section SS1, and a solvent supply section SS2.

The reactor 10 reacts a plurality of kinds of raw material solutions with each other while allowing a mixed raw material solution to flow, the mixed raw material solution containing the plurality of kinds of raw material solutions mixed with each other, namely, two kinds of a first raw material solution RS1 and a second raw material solution RS2 in this embodiment, thereby generating a proposed target solution TS. The reactor 10 includes a reaction channel 20 and a solvent channel 30.

The reaction channel 20 allows the mixed raw material solution containing the mixed first and second raw material solutions RS1 and RS2, which are the plurality of kinds of raw material solutions, to flow in the reaction channel 20. Although not graphically shown, the reactor 10 according to this embodiment further includes a temperature-control-fluid channel adjacent to the reaction channel 20. In the temperature-control-fluid channel, a temperature control fluid flows. The temperature control fluid is used for adjusting the temperature of the mixed raw material solution flowing in the reaction channel 20 so as to make the temperature of the mixed raw material solution be a temperature suitable for the reaction of the mixed raw material solution.

The reaction channel 20 includes a plurality of divisional reaction channels 22 and a plurality of three-way pipes 24. The plurality of divisional reaction channels 22 are aligned along the longitudinal direction thereof, that is, the direction in which the mixed solution of the first and second raw material solutions RS1 and RS2 flows. The plurality of three-way pipes 24 are disposed between two divisional reaction channels 22 adjacent to each other out of the plurality of divisional reaction channels 22, respectively, to interconnect the two divisional reaction channels 22. Each of the plurality of three-way pipes 24 has a mixed solution inlet, a solvent inlet, and a mixed solution outlet, wherein the mixed solution inlet is connected to the downstream end of the divisional reaction channel 22 upstream of the three-way pipe 24, and the mixed solution outlet is connected to the upstream end of the divisional reaction channel 22 downstream of the three-way pipe 24.

The downstream end of the reaction channel 20 is connected with a target solution storage tank 26. The target solution storage tank 26 receives and stores a target solution TS that is generated by the flow of the mixed raw material solution in the reaction channel 20.

The raw material solution supply section SS1 includes a three-way pipe 28, a first raw material solution supply channel 40, a first raw material solution storage tank 42, a first raw material solution supply pump 44, a second raw material solution supply channel 50, a second raw material solution storage tank 52, and a second raw material solution supply pump 54.

The three-way pipe 28 has an outlet connected to the upstream end of the reaction channel 20 and first and second inlets opposite to the outlet. The first inlet is connected with the first raw material solution storage tank 42 through the first raw material solution supply channel 40, and the second inlet is connected with the second raw material solution storage tank 52 through the second raw material solution supply channel 50. The first raw material solution supply channel 40 allows the first raw material solution RS1 to flow therein, and the second raw material solution supply channel 50 allows the second raw material solution RS2 to flow therein. The first and second raw material solutions RS1 and RS2 are merged in the three-way pipe 28, which causes a mixed raw material solution containing the first raw material solution RS1 and the second raw material solution RS2 with each other to flow in the reaction channel 20.

The first raw material solution storage tank 42 stores the first raw material solution RS1. The first raw material solution supply channel 40 has a downstream end connected to the three-way pipe 28 and an upstream end connected to the first raw material solution storage tank 42. The first raw material solution supply pump 44 is provided in the middle of the first raw material solution supply channel 40, and operates to supply the first raw material solution RS1 stored in the first raw material solution storage tank 42 to the reaction channel 20 through the first raw material solution supply channel 40 and the three-way pipe 28.

The second raw material solution storage tank 52 stores the second raw material solution RS2. The second raw material solution supply channel 50 has a downstream end connected to the three-way pipe 28 and an upstream end connected to the second raw material solution storage tank 52. The second raw material solution supply pump 54 is provided in the middle of the second raw material solution supply channel 50, and operates to supply the raw material solution RS2 stored in the second raw material solution storage tank 52 to the reaction channel 20 through the second raw material solution supply channel 50 and the three-way pipe 28.

The solvent channel 30 allows the target solution TS to flow in the solvent channel 30 as a solvent. The solvent according to this embodiment is, therefore, the target solution TS. The solvent supply section SS2 is configured to supply the target solution TS to the reaction channel 20 through the solvent channel 30 as the solvent, including the target solution storage tank 26, and a solvent supply pump 36 provided in the solvent channel 30. The target solution TS supplied as a solvent dissolves in the mixed raw material solution, thereby restraining the temperature of the mixed raw material solution from being raised by the reaction in the mixed raw material solution. The solvent channel 30 is connected to the reaction channel 20 between the upstream end and the downstream end of the reaction channel 20 so as to cause the target solution TS as a solvent to be mixed with the mixed raw material solution flowing in the reaction channel 20 from the middle of the reaction channel 20.

The solvent channel 30 includes a common channel 32 and a plurality of (there in this embodiment) supply channels 34. These are explained below.

In the common channel 32, a target solution TS as a solvent flows. The common channel 32 has an upstream end connected to the target solution storage tank 26. The solvent supply pump 36 is provided in the middle of the common channel 32 and operates to make the target solution TS stored in the target solution storage tank 26 flow in the common channel 32.

In each of the plurality of supply channels 34, a target solution TS flows as a solvent. Each of the plurality of supply channels 34 has an upstream end joined to the common channel 32 and a downstream end connected to the reaction channel 20. The respective downstream ends of the plurality of supply channels 34 are connected to the reaction channel 20 at respective positions different from each other in the longitudinal direction of the reaction channel 20, that is, in the direction in which the mixed raw material solution flows in the reaction channel 20. This enables the target solution. TS as a solvent to be mixed with the mixed raw material solution flowing in the reaction channel 20 at a plurality of positions different from each other.

The respective upstream ends of the plurality of supply channels 34 are connected to the common channel 32. Specifically, the respective upstream ends of the plurality of supply channels 34 are connected to the common channel 32 at respective positions downstream of the solvent supply pump 36 with respect to the direction in which the target solution TS flows in the supply channel 34. This enables the target solution TS flowing in the common channel 32 to flow into each of the plurality of supply channels 34.

The plurality of supply channels 34 are connected to the solvent inlets of the plurality of three-way pipes 24, respectively. This causes respective target solutions TS as a solvent flowing in the plurality of supply channels 34 to be merged with the mixed raw material solution flowing in the reaction channel 20 in the three-way pipes 24 and mixed with the mixed raw material solution.

The reactor 10 further includes a plurality of supply amount adjusting devices, which are three in this embodiment. The plurality of supply amount adjusting devices are provided to the plurality of supply channels 34, respectively. Each of the plurality of supply amount adjusting devices includes a flow control valve 60 and a temperature measuring device 70. The flow control valve 60 operates to change the flow rate of the target solution TS as a solvent to be supplied to the reaction channel 20 through a corresponding supply channel, which is a channel selected from the plurality of supply channels 34 and corresponding to the supply amount adjusting device. The temperature measuring device 70 measures the temperature of the mixed raw material solution flowing in the reaction channel 20. Specifically, the temperature measuring device 70 measures the temperature of the mixed raw material solution flowing in the divisional reaction channel 22 connected to the downstream side of the three-way pipe 24 to which the corresponding supply channel of the plurality of supply channels 34 is connected, with respect to the direction in which the mixed raw material solution flows. The temperature measuring device 70, therefore, measures the temperature of the mixed raw material solution with which the target solution TS has been mixed as a solvent.

The temperature measuring device 70 further has a function as a control unit. Specifically, the temperature measuring device 70 operates the flow control valve 60 provided in the corresponding supply channel among the plurality of supply channels 34 to thereby adjust the flow rate of the target solution TS that is supplied as a solvent to the reaction channel 20 through the corresponding supply channel, in response to the temperature measured by the temperature measuring device 70. Each of the temperature measuring devices 70, thus, is configured as the control unit to operate the flow control valve 60 in accordance with the temperature measured by the temperature measuring device 70 to thereby adjust the supply amount of the target solution TS to control the temperature of the mixed raw material solution. The control unit, however, may be provided separately from the temperature measuring device 70. For example, the control unit may be shared by a plurality of supply amount adjusting device.

Subsequently, there will be described a method of generating a target solution TS using the reactor system RS including the reactor 10. The production method includes a reaction step and a solvent supply step.

The reaction step is a step of allowing a mixed raw material solution to flow in the reaction channel 20, the mixed raw material solution containing a first raw material solution RS1 and a second raw material solution R2 that have been supplied to the reaction channel 20 to be mixed with each other, thereby reacting the first raw material solution RS1 with the second raw material solution RS2 in the reaction channel 20 to generate a target solution TS. Specifically, in the present embodiment, the first raw material solution supply pump 44 provided in the first raw material solution supply channel 40 is driven to supply the first raw material solution RS1 stored in the first raw material solution storage tank 42 to the three-way pipe 28 connected to the upstream end of the reaction channel 20, and the second raw material solution supply pump 54 provided in the second raw material solution supply channel 50 is driven to supply the second raw material solution RS2 stored in the second raw material solution storage tank 52 to the three-way pipe 28 connected to the upstream end of the reaction channel 20. This causes the first raw material solution RS1 flowing in the first raw material solution supply channel 40 and the second raw material solution RS2 flowing in the second raw material solution supply channel 50 to be mixed in the three-way pipe 28. A mixed raw material solution containing the first raw material solution RS1 and the second raw material solution RS2 thus mixed with each other is made to flow in the reaction channel 20.

The first and second raw material solutions RS1 and RS2 contained in the mixed raw material solution react with each other while flowing in the reaction channel 20. This results in the generation of the target solution TS. The generated target solution TS is stored in the target solution storage tank 26 connected to the downstream end of the reaction channel 20.

The temperature of the mixed raw material solution is raised by heat that occurs accompanying the reaction between the first and second raw material solutions RS1 and RS2, namely, reaction heat. The higher the temperature of the mixed raw material solution, the more accelerated the reaction is. However, excessively raised temperature of the mixed raw material solution causes the reaction in the mixed raw material solution to run away. This generates a necessity of appropriately managing the temperature of the mixed raw material solution.

The solvent supply step is a step of supplying a solvent (namely, the target solution TS in this embodiment) to the mixed raw material solution flowing in the reaction channel 20 at a middle portion between the upstream end and the downstream end of the reaction channel 20 to thereby adjust the temperature of the mixed raw material solution. Specifically, in the reactor 10, the target solution. TS is mixed as a solvent with the mixed raw material solution flowing in the reaction channel 20 at the middle of the reaction channel 20 so as to restrain the temperature of the mixed raw material solution from being raised by the reaction in the mixed raw material solution containing a plurality of kinds of raw material solutions, namely, the first and second raw material solutions RS1 and RS2 in this embodiment, mixed with each other. This makes it possible to restrain the temperature of the mixed raw material solution from excessively rising with the reduced time required for generating the target solution TS. The reason as follows.

In the reactor 10, until the target solution TS as a solvent is mixed with the mixed raw material solution, it is possible to raise the temperature of the mixed raw material solution by utilization of heat generation due to the reaction between the first and second raw material solutions RS1 and RS2 in the mixed raw material solution. This makes it possible to quickly raise the temperature of the mixed raw material solution to a temperature suitable for the reaction to thereby accelerate the reaction. This allows a generation requirement time, which is a time required for generation of the target solution TS, to be shorten.

Figure 2:
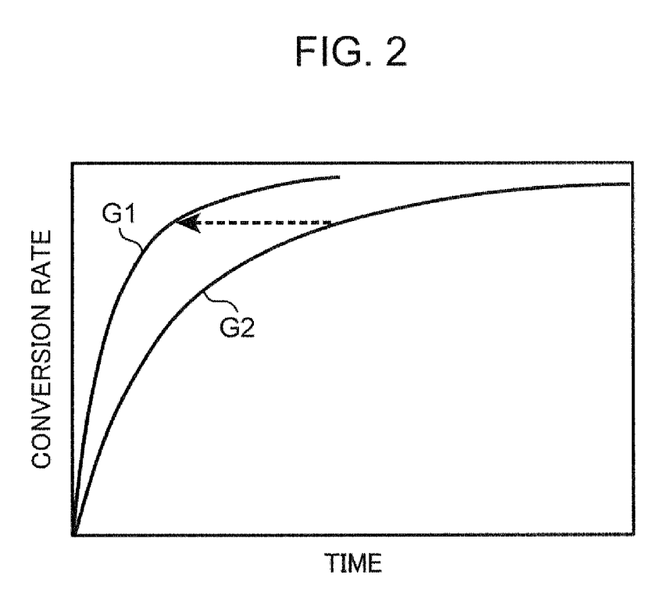
FIG. 2 is a graph showing a relationship between a conversion rate and a reaction time when a plurality of kinds of raw material solutions are mixed to be reacted by use of the reactor according to a first embodiment of the present invention.

Regarding the shortened generation requirement time, there will be further specifically described with reference to FIG. 2, which is a graph showing a curve G1 that represents a temporal change in the conversion rate with the generation of the target solution TS in the reactor 10. FIG. 2 also shows a curve G2 that represents the temporal change in the conversion rate in the comparative example. In the comparative example, the first and second raw material solutions RS1 and RS2, which are a plurality of kinds of raw material solution, are mixed with the liquid in which the first and second raw material solutions RS1 and RS2 are to dissolve, i.e., a liquid functioning as a solvent, from the stage prior to the reaction of the first and second raw material solutions RS1 and RS2, whereby a target solution TS is generated. The conversion rate is a ratio of the amount of the raw material (namely, the first and second raw material solutions RS1 and RS2 in the above embodiment) that is eliminated by the reaction to the supply amount of the raw material.

As indicated by the aforementioned curves G1 and G2 of FIG. 2, according to the reaction (curve G1) in the aforementioned reactor 10, the time until the conversion rate reaches a predetermined value is short as compared with the comparative example (curve G2). The reactor 10, thus, allows the time required for generating the target solution TS to be shorten.

Besides, in the reactor 10, mixing of the target solution TS as a solvent with the mixed raw material solution lowers the concentration of the raw material solution in the solution after mixing and lowers the temperature of the mixed raw material solution, thereby enabling the temperature in the mixed raw material solution to be restrained from excessively rising.

Figure 3:
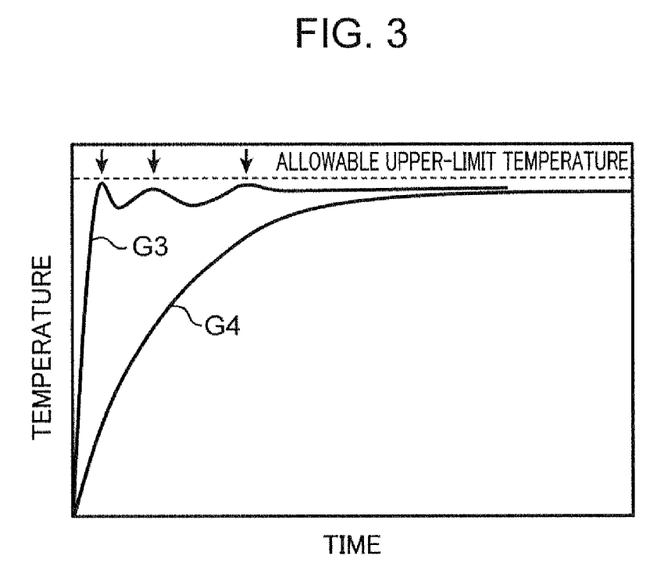
FIG. 3 is a graph showing a relationship between the temperature of the mixed raw material solution and a reaction time when a plurality of kinds of raw material solutions are mixed to be reacted by use of the reactor according to the first embodiment of the present invention.

Regarding such restraint of the temperature rise, there will be further specifically described with reference to FIG. 3, which is a graph showing a curve G3 representing the relationship between the temperature of the mixed raw material solution and the reaction time in the case of generating the target solution TS using the reactor 10. FIG. 3 also shows a curve G4 representing the relationship between the temperature of the mixed raw material solution and the time in a comparative example. In the comparative example, the first and second raw material solutions RS1 and RS2 which are a plurality of kinds of raw material solution are mixed with a liquid in which the raw material solution. RS1, RS2 is to dissolve (i.e., a liquid which functions as a solvent) from the beginning to generate the target solution TS.

As indicated by the aforementioned curves G3 and G4 of FIG. 3, according to the reaction in the aforementioned reactor 10 (curve G3), the time until the temperature reaches a predetermined one (a temperature suitable for the reaction in the mixed raw material solution) is short as compared with the comparative example (curve G4). Besides, in FIG. 3, the timing at which the target solution TS is mixed with the mixed raw material solution is indicated by an arrow, the arrow and the curve G3 showing that mixing the target solution TS with the mixed raw material solution restrains the temperature of the mixed raw material solution from excessively rising. This teaches that the reactor 10 and the method of generating a target solution using the same makes it possible to restrain the temperature in the mixed raw material solution from excessively rising.

The solvent channel 30 of the reactor 10, including a plurality of supply channels 34 which are connected to the reaction channel 20 at respective different positions with respect to the direction in which the mixed raw material solution flows in the reaction channel, enables the solvent (the target solution TS in the above embodiment) to be mixed with the mixed raw material solution flowing in the reaction channel 20 in a plurality of divided times. This allows the temperature of the mixed raw material solution to be adjusted easily as compared with a case of mixing the target solution. TS as a solvent with the mixed raw material solution flowing in the reaction channel 20 at a single time. Specifically, mixing the target solution TS as a solvent at a single time with the mixed raw material solution flowing in the reaction channel 20 disables the temperature of the mixed raw material solution from being thereafter adjusted. In contrast, mixing the target solution TS as a solvent in a plurality of divided times with the mixed raw material solution flowing in the reaction channel 20 enables the temperature of the mixed raw material solution to be adjusted over a plurality of times, thereby allowing the temperature of the mixed raw material solution to be more easily maintained at a temperature suitable for accelerating the reaction in the mixed raw material solution.

The temperature measuring device 70 of the reactor 10, functioning as a control unit that operates the flow control valve 60 to adjust the flow rate of the target solution TS as a solvent supplied to the reaction channel 20, allows the supply amount of the target solution TS at each time to be individually adjusted when the target solution TS as a solvent is mixed with the mixed raw material solution flowing in the reaction channel 20 in a plurality of divided times. This makes it possible to control the temperature of the mixed raw material solution with high accuracy.

The temperature measuring device 70 functioning as the control unit is able to control the temperature of the mixed raw material solution with higher accuracy by adjusting the supply flow rate of the solvent (target solution TS) to the mixed raw material solution flowing in the reaction channel 20 in accordance with the temperature of the mixed raw material solution (the temperature measured by the temperature measuring device 70).

The use of the target solution TS as a solvent, differently from the case of mixing a dedicated liquid as a solvent with the target solution TS, eliminates the need for a step of specially separating the dedicated solvent from the target solution TS through distillation or the like.

Figure 4:
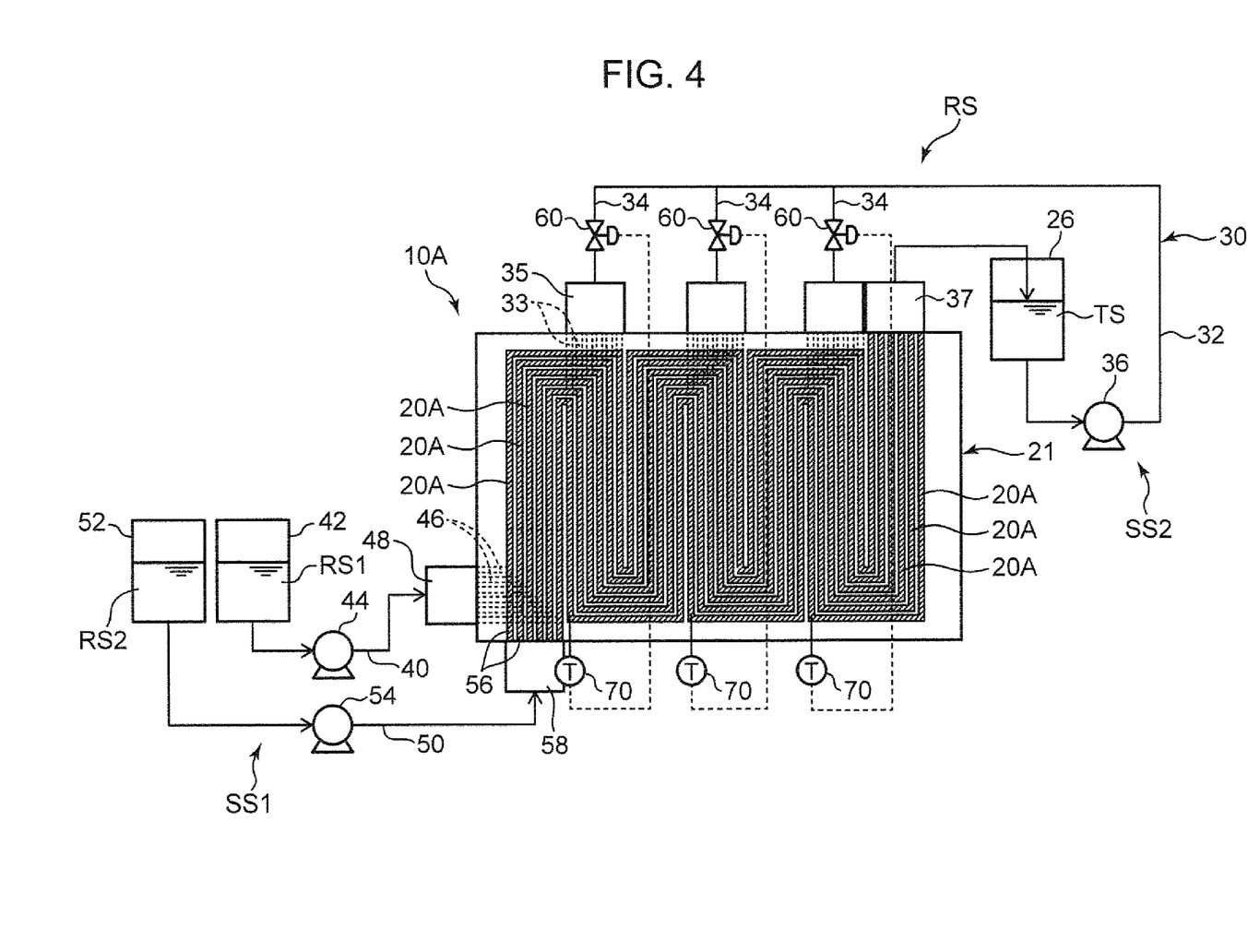
FIG. 4 is a schematic view showing a schematic configuration of a reactor according to a second embodiment of the present invention.

The reactor according to the present invention is not limited to one having only a single reaction channel, but also allowed, for example, to include a plurality of micro reaction channels extending in parallel to each other. FIG. 4 shows an example of an embodiment including a plurality of reaction channels, namely, a reactor 10A according to a second embodiment of the present invention.

The reactor 10A includes a channel formation body 21 that forms a plurality of reaction channels 20A. The plurality of reaction channels 20A are a plurality of micro channels extending in parallel to each other. The plurality of reaction channels 20A are formed inside the channel formation body 21. For ease of understanding, each of the plurality of reaction channels 20A is given a hatching in FIG. 4. The hatching, therefore, does not indicate a cross section. The channel formation body 21 is constituted by, for example, a plurality of plates laminated with each other. Between two plates mutually superposed in the lamination direction, in the plurality of plates, at least a part of each of the plurality of reaction channels 20A is formed.

The reactor 10A constitutes a reactor system RS in association with a raw material solution supply section SS1 and a solvent supply section SS2.

The raw material solution supply section SS1 supplies a first raw material solution RS1 and a second raw material solution RS2 to each of the plurality of reaction channels 20A. The raw material solution supply section SS1 includes a first raw material solution supply channel 40, a first raw material solution storage tank 42, a first raw material solution supply pump 44, a second raw material solution supply channel 50, a second raw material solution storage tank 52 and a second raw material solution supply pump 54, which are similar to that in the first embodiment, and further includes a plurality of first introduction channels 46, a first inlet header 48, a plurality of second introduction channels 56, and a second inlet header 58. The plurality of first introduction channels 46 are formed inside the channel formation body 21 so as to provide communication between respective upstream ends of the plurality of reaction channels 20A and the outer end of the channel formation body 21. The first inlet header 48 is connected to respective inlets of the plurality of first introduction channels 46 to distribute the first raw material solution RS1 fed by the first raw material solution supply pump 44 through the first raw material solution supply channels 40 to the plurality of first introduction channels 46 and further to the plurality of reaction channels 20A. The plurality of second introduction channels 56 are formed inside the channel formation body 21 so as to provide communication between respective upstream ends of the plurality of reaction channels 20A and a portion of the outer ends of the channel formation body 21, the portion being different from respective portions where the inlets of the plurality of first introduction channels 46 are located. The second inlet header 58 is connected to respective inlets of the plurality of second introduction channels 56 to distribute the second raw material solution RS2 fed by the second raw material solution supply pump 54 through the second raw material solution supply channel 50 to the plurality of second introduction channels 56 and further to the plurality of reaction channels 20A.

The solvent channel 30 according to this embodiment includes, in addition to a common channel 32 and a plurality of supply channels 34 which are similar to that of the first embodiment, a plurality of solvent introduction channels 33 and a plurality of solvent inlet headers 35. The plurality of solvent introduction channels 33 are formed inside the channel formation body 21 so as to provide communication between a plurality of middle portions of each of the reaction channels 20A (namely, a first middle portion, a second middle portion and a third middle portion, which are aligned in order from the upstream side in the example shown in FIG. 4) and the outer end of the channel formation body 21. The solvent inlet headers 35 are disposed for the first to third middle portions, respectively, and connected to respective inlets of the plurality of solvent introduction channels 33 communicated with the corresponding middle portions thereof and to the downstream end of the corresponding supply channel out of the plurality of supply channels 34. The solvent inlet header 35 distributes the solvent supplied by the solvent supply pump 36 through the common channel 32 and the supply channel 34, namely, the target solution TS, to the plurality of solvent introduction channels 33 to supply the solvent to respective middle portions of the plurality of reaction channels 20A.

Besides, the reactor system. RS includes an outlet header 37 communicated with respective downstream ends of the plurality of reaction channels 20A. The target solutions TS generated in the plurality of reaction channels 20A, respectively, are merged with each other in the outlet header 37 and introduced to the target solution storage tank 26.

Such a reactor 10A and a reactor system RS including the same also allow the same effect as in the first embodiment to be obtained. Specifically, supplying a solvent from the target solution storage tank 26 to respective middle portions of the plurality of reaction channels 20A through a common channel 32, a plurality of supply channels 34, a plurality of solvent inlet headers 35, and a solvent introduction channel corresponding to the reaction channel out of the plurality of solvent introduction channels 33 in this order enables both rapid reaction and proper temperature control in the respective reaction channels 20A to be achieved.

Figure 6:
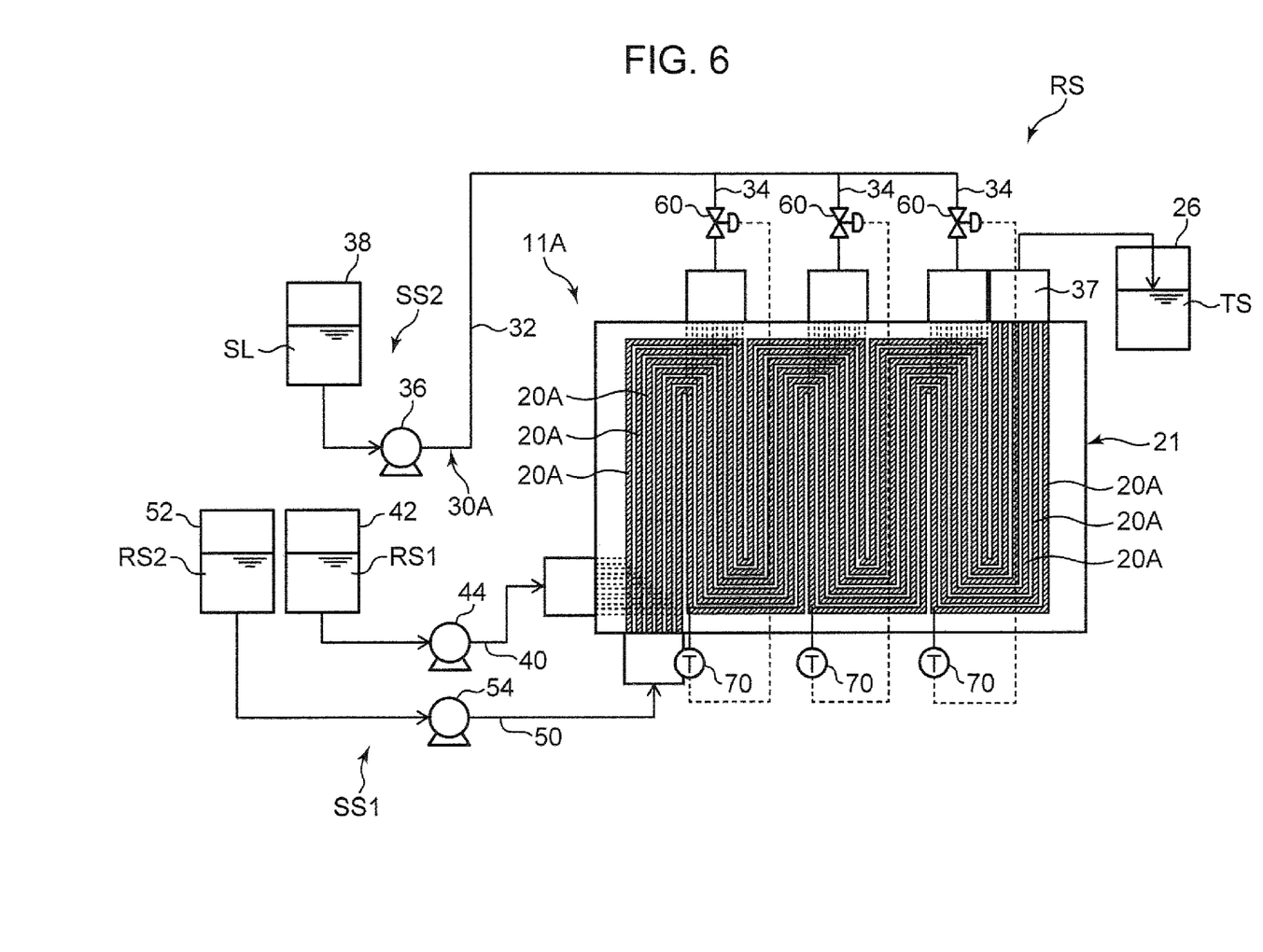
FIG. 6 is a schematic diagram showing a configuration of a reactor according to a variation of the second embodiment and a reactor system including the reactor.

Furthermore, in the reactor 10A according to the second embodiment, which includes the plurality of reaction channels 20A extending in parallel to each other, as reaction channels, the common supply channel 34 being connected to the plurality of reaction channels 20A through the common solvent inlet header 35, providing flow control valves 60 to the supply channels 34, respectively, as shown in FIG. 6, enables respective temperatures of the mixed raw material solutions flowing in the plurality of reaction channels 20A to be collectively adjusted by the operation of the flow control valves 60.

The solvent to be mixed with the mixed raw material solution flowing in the reaction channel according to the present invention is not limited to a target solution, that is, a solution generated by mixing and reacting a plurality of kinds of raw material solutions (first and second raw material solutions RS1 and RS2 in the first and second embodiments). It is also possible to prepare a dedicated liquid other than the target solution, as a solvent to be mixed with the mixed raw material solution flowing in the reaction channel, and to mix the liquid dedicated to the solvent with the mixed raw material solution. As an example of such a mode, FIG. 5 shows a reactor 11, which is a variation of the reactor 10 according to the first embodiment, and a reactor system RS including the same, and FIG. 6 shows a reactor 11A, which is a variation of the reactor 10A according to the second embodiment, and a reactor system RS including the same.

Figure 5:
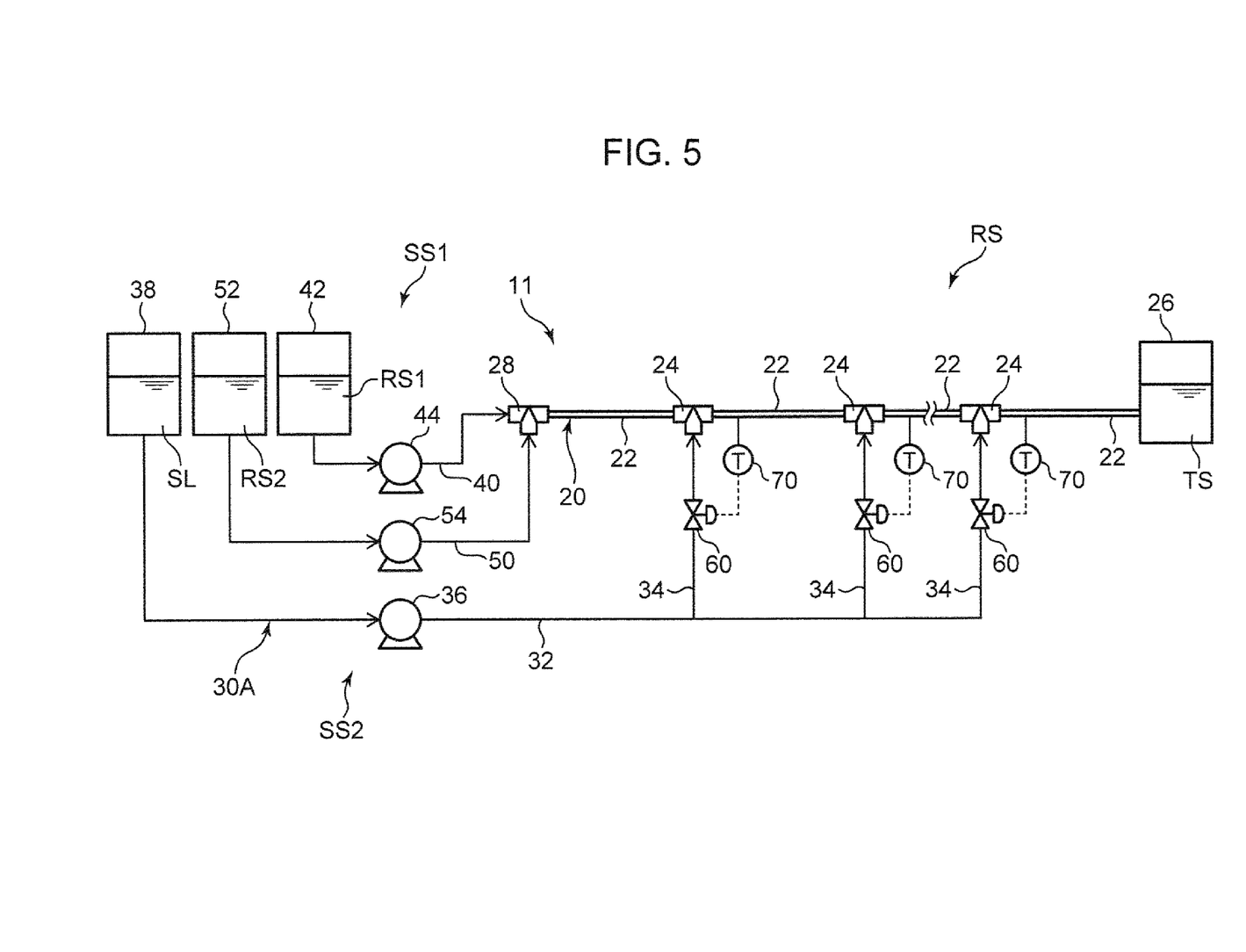
FIG. 5 is a diagram showing a configuration of a reactor according to a variation of the first embodiment and a reactor system including the reactor.

The reactor 11 shown in FIG. 5 differs from the reactor 10 in including a solvent channel 30A in place of the solvent channel 30 shown in FIG. 1. The solvent channel 30A, although including a common channel 32 and a plurality of supply channels 34 as well as the solvent channel 30, differs from the solvent channel 30 in that the upstream end of the common channel 32 is connected not to the target solution storage tank 26 but to a solvent storage tank 38 other than the target solution storage tank 26.

The solvent storage tank 38 stores a dedicated solvent SL. This solvent SL is prepared separately from the target solution TS. Specifically, the reactor system RS shown in FIG. 5 includes the solvent storage tank 38 in addition to the target solution storage tank 26 shown in FIG. 1, and the solvent storage tank 38 and the solvent supply pump 36 constitute a solvent supply section SS2 that supplies the solvent SL to a middle portion of the reaction channel 20 through the solvent channel 30A.

Although the target solution TS generated by the reactor 11 includes the solvent SL which is a liquid other than the target solution TS, it is possible to obtain a target solution TS finally not containing the solvent SL by separating the solvent SL from the target solution TS through distillation or the like. It is, hence, preferable that the solvent SL is composed of a liquid separable from the target solution TS.

In this way, also in the reactor 11 according to the modification, the same effect can be obtained as that of the reactor 10 according to the first embodiment.

Besides, the solvent SL to be mixed with the mixed raw material solution flowing in the reaction channel 20 in the reactor 11, being a liquid stored separately from the target solution TS, makes it possible to supply the solvent SL having a lower temperature to the mixed raw material solution, as compared with the case of mixing the target solution TS generated in the reactor with the mixed raw material solution as a solvent. This allows the temperature of the mixed raw material solution to be more easily adjusted.

Specifically, the target solution TS, which is generated by a reaction involving heat generation between a plurality of kinds of raw material solutions contained in the mixed raw material solution, generally has a high temperature. Accordingly, for lowering the temperature of the mixed raw material solution by mixing the target solution TS with the mixed raw material solution as a solvent, the target solution TS to be supplied to the mixed raw material solution is required to be pre-cooled before the supply.

In contrast, in the case of mixing the solvent SL prepared separately from the target solution TS with the mixed raw material solution, it is only necessary to prepare a solvent SL having a sufficiently lower temperature than the target solution TS, and it is extremely easy to prepare such a solvent SL. Because of such easy preparation of a solvent SL having a low temperature separate from the target solution TS, the use of the solvent SL allows the temperature of the mixed raw material solution to be more easily adjusted.

FIG. 6 shows a reactor 11A according to a variation of the second embodiment. This reactor 11A includes a plurality of minute reaction channels 20A extending in parallel to each other as in the case of the reactor 10A according to the second embodiment, and a solvent channel 30A connected to each of the plurality of reaction channels 20A, and the plurality of reaction channels 20A is formed inside the channel formation body 21; however, the reactor 11A differs from the reactor 10A in that the upstream end of the solvent channel 30, that is, the upstream end of the common channel 32, is connected not to the target solution storage tank 26 but to the solvent storage tank 38 in the same manner as in the variation of the first embodiment. Specifically, the reactor system RS shown in FIG. 6 includes a solvent storage tank 38 which stores a dedicated solvent SL, in addition to the target solution storage tank 26, similarly to the reactor system RS shown in FIG. 5, and the solvent channel 30 is arranged so as to supply the solvent SL stored in the solvent storage tank 38 to respective middle portions of the plurality of reaction channels 20A.

Also in such a reactor 11A, it is possible to obtain an effect similar to that of the modification of the first embodiment, that is, an effect that the temperature of the mixed raw material solution can be easily adjusted by supplying a solvent SL having a low temperature.

Besides, in the reactor 11A, similarly to the second embodiment, providing flow control valves 60 in middle of the plurality of supply channels 34 in the solvent channel 30, respectively, enables respective temperatures of the mixed raw material solutions flowing in the plurality of reaction channels 20A to be collectively adjusted by the common flow control valve 60.

The embodiments of the present invention, having been described above in detail, are only examples, and the present invention is not to be construed in any way as being limited by the description of the above-mentioned embodiments.

For example, in the first and second embodiment above, it is also possible to supply necessary solvent to the mixed raw material solution flowing in the reaction channel at once at the middle of the reaction channel.

For example, in the first and second embodiment above, it is also possible to mix the target solution TS and a liquid prepared separately from the target solution TS with the mixed raw material solution as a solvent, respectively.

As described above, there is provided a reactor for reacting a plurality of kinds of raw material solutions with each other while allowing a mixed raw material solution to flow, the mixed raw material solution containing the plurality of kinds of raw material solutions mixed with each other, to thereby generate a proposed target solution, the reactor being capable of restraining the temperature in the mixed raw material solution from excessively rising, with a shortened time required for generating the target solution, and a reactor system including the same.

Provided is a reactor for reacting a plurality of kinds of raw material solutions with each other to thereby generate a proposed target solution, the reactor comprising: a reaction channel that allows the mixed raw material solution to flow in the reaction channel, the mixed raw material solution containing the plurality of kinds of raw material solutions mixed with each other; and a solvent channel that allows a solvent to flow in the solvent channel, the solvent being dissolvable in the mixed raw material solution to thereby reduce a concentration of the raw material solution, wherein the solvent channel is connected to the reaction channel between an upstream end and a downstream end of the reaction channel so as to cause the solvent flowing in the solvent channel to be mixed with the mixed raw material solution flowing in the reaction channel from the middle of the reaction channel.

In such a reactor, where the solvent is mixed with the mixed raw material solution flowing in the reaction channel in the middle of the reaction channel, raising the temperature of the mixed raw material solution by utilization of the heat generation caused by the reaction in the mixed raw material solution until the solvent is mixed with the mixed raw material solution enables the reaction in the mixed raw material solution to be accelerated, while, in the solution where the solvent has been mixed with the mixed raw material solution, the concentration of the raw material solution contributing to the reaction is lowered and the solvent functions as a coolant for lowering the temperature of the mixed raw material solution, which makes it possible to restrain the temperature in the mixed raw material solution from excessively rising.

The solvent channel preferably includes a plurality of supply channels, which have respective downstream ends connected to the reaction channel at respective positions different from each other in the direction of flow of the mixed raw material solution.

The plurality of supply channels make it possible to mix the solvent with the mixed raw material solution flowing in the reaction channel in a plurality of divided times, thereby allowing the temperature of the mixed raw material solution to be more easily adjusted as compared with a case of mixing the solvent at a single time with the mixed raw material solution flowing in the reaction channel. Specifically, mixing the solvent at once with the mixed raw material solution flowing in the reaction channel disables the temperature of the mixed raw material solution from being adjusted thereafter; however, mixing the solvent in a plurality of divided times with the mixed raw material solution flowing in the reaction channel makes it possible to adjust the temperature of the mixed raw material solution over a plurality of times. This allows the temperature of the mixed raw material solution to be more easily maintained at a temperature suitable for accelerating the reaction in the mixed raw material solution.

The reactor, preferably, further includes a plurality of supply amount adjusting devices provided to the plurality of supply channels, respectively, wherein each of the plurality of supply amount adjusting devices includes a flow control valve that is provided in a corresponding supply channel, which is a supply channel selected from the plurality of supply channels and corresponding to the supply amount adjusting device, and operates to change the flow rate of the solvent supplied to the reaction channel through the corresponding supply channel.

The flow control valve provided in each of the plurality of supply channels allows the supply amount of the solvent in each time to be individually adjusted when the solvent is mixed in a plurality of divided times with the mixed raw material solution flowing in the reaction channel. This allows the temperature of the mixed raw material solution to be adjusted with higher accuracy.

It is preferable that each of the plurality of supply amount adjusting devices further includes a temperature measuring device that measures the temperature of the mixed raw material solution flowing in the reaction channel downstream of the corresponding supply channel, and a control unit that operates the flow control valve provided in the corresponding supply channel in accordance with the temperature measured by the temperature measuring device to thereby adjust the flow rate of the solvent supplied to the reaction channel through the corresponding supply channel.

The control unit, operating the operation of the flow control valve to adjust the supply amount of the solvent to the mixed raw material solution flowing in the reaction channel in accordance with the temperature of the mixed raw material solution measured by the temperature measuring device, can control the temperature of the mixed raw material solution with high accuracy.

Also provided is a reactor system comprising the reactor, a raw material solution supply section that supplies the plurality of kinds of raw material solutions to the reaction channel of the reactor, and a solvent supply section that supplies the solvent through the solvent channel to the reaction channel.

The solvent supply section is, for example, configured to store the target solution generated in the reaction channel and to supply the target solution to the reaction channel through the solvent channel as the solvent, preferably. The solvent supply section, which mixes the target solution generated in the reaction channel as a solvent with the mixed raw material solution, eliminates the need for separating the solvent from the target solution through distillation or the like.

The solvent supply section, alternatively, may be configured to supply a liquid separable from the target, solution to the reaction channel as the solvent. The solvent supply section according to this mode is able to supply a solvent having a lower temperature to the reaction channel as compared with a case of mixing the target solution with a mixed raw material solution as a solvent. This allows the temperature of the mixed raw material solution to be more easily adjusted. Furthermore, it is possible to obtain the target solution not containing the solvent by separating the solvent from the mixed liquid composed of the target solution and the solvent and discharged from the reactor.

The invention claimed is:

1. A reactor for reacting a plurality of kinds of raw material solutions with each other while allowing a mixed raw material solution to flow, the mixed raw material solution containing the plurality of kinds of raw material solutions mixed with each other, to thereby generate a proposed target solution, the reactor comprising:

a reaction channel that allows the mixed raw material solution to flow in the reaction channel, the mixed raw material solution containing the plurality of kinds of raw material solutions mixed with each other; and a solvent channel that allows a solvent to flow in the solvent channel, the solvent being dissolvable in the mixed raw material solution to thereby reduce a concentration of the raw material solution, wherein the solvent channel is connected to the reaction channel between an upstream end and a downstream end of the reaction channel so as to cause the solvent flowing in the solvent channel to be mixed with the mixed raw material solution flowing in the reaction channel, the solvent channel includes a plurality of supply channels, which have respective downstream ends connected to the reaction channel at respective positions different from each other in a direction of flow of the mixed raw material solution, the reactor further comprises a plurality of supply amount adjusting devices provided to the plurality of supply channels, respectively, wherein each of the plurality of supply amount adjusting devices includes a flow control valve that is provided in a corresponding supply channel, which is a supply channel selected from the plurality of supply channels and corresponding to the supply amount adjusting device, and operates to change a flow rate of the solvent supplied to the reaction channel through the corresponding supply channel, and each of the plurality of supply amount adjusting devices further includes a temperature measuring device that measures the temperature of the mixed raw material solution flowing in the reaction channel downstream of the corresponding supply channel, and a control unit that operates the flow control valve provided in the corresponding supply channel in accordance with the temperature measured by the temperature measuring device to adjust a flow rate of the solvent supplied to the reaction channel through the corresponding supply channel.

* * * * *